(12) United States Patent
Lee et al.

(10) Patent No.: US 10,320,541 B2
(45) Date of Patent: Jun. 11, 2019

(54) DEVICE FOR TRANSMITTING DATA IN WIRELESS COMMUNICATION SYSTEM

(71) Applicant: LG ELECTRONICS INC., Seoul (KR)

(72) Inventors: Sangrim Lee, Seoul (KR); Hyunsoo Ko, Seoul (KR); Jaehoon Chung, Seoul (KR); Kwangseok Noh, Seoul (KR); Dongkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/560,404

(22) PCT Filed: Sep. 24, 2015

(86) PCT No.: PCT/KR2015/010075
§ 371 (c)(1),
(2) Date: Sep. 21, 2017

(87) PCT Pub. No.: WO2016/163605
PCT Pub. Date: Oct. 13, 2016

(65) Prior Publication Data
US 2018/0062808 A1 Mar. 1, 2018

Related U.S. Application Data

(60) Provisional application No. 62/144,939, filed on Apr. 9, 2015.

(51) Int. Cl.
*H04L 5/00* (2006.01)
*H04L 27/26* (2006.01)
(Continued)

(52) U.S. Cl.
CPC .......... *H04L 5/0048* (2013.01); *H04L 5/0091* (2013.01); *H04L 25/0216* (2013.01);
(Continued)

(58) Field of Classification Search
CPC .............. H04L 5/0048; H04L 27/2636; H04L 27/2628; H04L 5/0091; H04L 27/264;
(Continued)

(56) References Cited

U.S. PATENT DOCUMENTS

2010/0098177 A1* 4/2010 Hamaguchi ........... H04L 5/0007
375/260
2010/0329283 A1* 12/2010 Luo ....................... H04L 27/265
370/480
(Continued)

FOREIGN PATENT DOCUMENTS

WO WO 2014/124661 A1 8/2014

OTHER PUBLICATIONS

Wild et al., "5G Air Interface Design based on Universal Filtered (UF-) OFDM", Proceedings of the 19th International Conference on Digital Signal Processing, IEEE, Aug. 20-23, 2014, pp. 699-704.

*Primary Examiner* — Faisal Choudhury
(74) *Attorney, Agent, or Firm* — Birch, Stewart, Kolasch & Birch, LLP

(57) ABSTRACT

Provided is a transmission device for transmitting data in a wireless communication based on DFT-spread OFDM. Specifically, provided is a transmission device which outputs a first sub-band and a second sub-band by performing DFT on an input symbol with a tail part and a head part in which at least one 0 has been inserted by a DFT block controlled by a processor, outputs a signal by performing IDFT on the first sub-band which has been mapped by a first IDFT block, allows the signal to be filtered by a first band pass filter, outputs a signal by performing IDFT on the second sub-band which has been mapped by a second IDFT block, and allows the signal to be filtered by a second band pass filter.

5 Claims, 14 Drawing Sheets

(51) Int. Cl.
*H04W 72/04* (2009.01)
*H04L 25/02* (2006.01)
*H04L 25/03* (2006.01)

(52) U.S. Cl.
CPC .... *H04L 25/0224* (2013.01); *H04L 25/03343* (2013.01); *H04L 27/264* (2013.01); *H04L 27/2628* (2013.01); *H04L 27/2636* (2013.01); *H04W 72/042* (2013.01); *H04W 72/044* (2013.01)

(58) Field of Classification Search
CPC ............. H04L 25/0216; H04L 25/0224; H04L 25/03343; H04W 72/044; H04W 72/042
USPC ........................................................ 370/329
See application file for complete search history.

(56) References Cited

U.S. PATENT DOCUMENTS

| | | |
|---|---|---|
| 2011/0228878 A1 | 9/2011 | Sorrentino |
| 2012/0032855 A1* | 2/2012 | Reede ................... G01S 5/0289 342/458 |
| 2012/0170516 A1 | 7/2012 | Noh et al. |
| 2015/0092756 A1* | 4/2015 | Sorrentino ........ H04W 56/0045 370/336 |

* cited by examiner

DEVICE FOR TRANSMITTING DATA IN WIRELESS COMMUNICATION SYSTEM

CROSS REFERENCE TO RELATED APPLICATIONS

This application is the National Phase of PCT International Application No. PCT/KR2015/010075, filed on Sep. 24, 2015, which claims priority under 35 U.S.C. 119(e) to U.S. Provisional Application No. 62/144,939, filed on Apr. 9, 2015, all of which are hereby expressly incorporated by reference into the present application.

BACKGROUND OF THE INVENTION

Field of the Invention

The present invention relates to wireless communication and, most particularly, to a transmitting device for transmitting data in a wireless communication system.

Related Art

The next generation multimedia wireless communication system, which has recently been very actively and extensively researched and developed, is being request to be evolved as a system that can process and transmit diverse information, such as images, wireless data (or radio data), and so on, excelling the initial voice-based services. For example, hologram and real-time UHD high picture quality services, which can provide higher transmission rates by using a larger amount of frequency resource as compared to the conventional wideband services. Additionally, mission critical services requesting low latency, emergency services or tactical internet service requesting ultimately low latency, and services such as V2X are being requested. Furthermore, massive machine communication, sensor networks, and so on, for supporting a massive number of devices are also be requested.

The purpose of such next generation wireless communication system is to allow reliable communication to be carried out regardless of the position and mobility of multiple users. However, the wireless channel has non-ideal characteristics, such as path loss, noise, fading caused by a multi-path, Inter Symbol Interference (ISI), or a Doppler effect caused by the mobility of the device. A wide range of technology is being researched and developed in order to overcome such non-ideal characteristics of the wireless channel and to enhance reliability in wireless communication.

It is difficult to provide the above-described services by using the Cyclic Prefix-OFDM (CP-OFDM) scheme of the conventional (or legacy) LTE system. Most particularly, by using the conventional LTE system, it is difficult to satisfy the request for low latency communication by using a TTI having the length of 1 ms. Accordingly, new types of waveforms that can satisfy such request are emerging. For example, new waveforms, such as Filter Bank Multi Carrier (FBMC), Generalized Frequency Division Multiplexing (GFDM), Universal Filtered-OFDM (UF-OFMD), and so on, are being discussed as the adequate waveforms for the next generation wireless communication system services. Among such waveforms, a next generation wireless communication system that can satisfy the request for low latency communication by adopting the UF-OFDM scheme, wherein filters are applied in sub-band units instead of using CPs, will be described in detail in this specification.

SUMMARY OF THE INVENTION

Technical Objects

An object of the present invention is to provide a device for transmitting data in a wireless communication system.

Technical Solutions

This specification proposes a transmitting device for transmitting data in a wireless communication system configured based on DFT spread OFDM.

The transmitting device includes a S-to-P block, a DFT block, a sub-carrier mapping block, a plurality of IDFT blocks and P-to-S blocks, and a plurality of band pass filters. Herein, a first IDFT block and a second IDFT block may be shown in order to illustrate the plurality of IDFT blocks, and a first pass band filter and a second band pass filter may be shown in order to illustrate the plurality of pass band filters.

The modulated input symbols are processed with serial-to-parallel conversion by the S-to-P block. And, at least one 0 (zero) is inserted in a head part and a tail part of each of the parallel-converted input symbols. Since the information on the number of allocated zero tones (0 tones) is determined by the receiving end, the number of allocated zeros (0's) may be determined by receiving information through a physical layer signal or a higher layer signal. Herein, a tone corresponds to a sub-carrier, and, eventually, a zero tone (0 tone) corresponds to a sub-carrier that is not being used in order to prevent interference. The input symbol having, 0's (zeros) inserted therein in accordance with the above-described process is then transmitted to the DFT block 1320.

The DFT block performs DFT spread on the inputted symbols and outputs complex-valued symbols. For example, when N number of symbols are inputted, a DFT size may be equal to N (wherein N is an integer). More specifically, the DFT block receives an input symbol having at least one zero (0) inserted in its head part and its tail part and then performs DFT spread.

The sub-carrier mapping block may also be referred to as a frequency domain data processing block because it spreads out the complex-valued symbols, which are processed with DFT spread, in the frequency domain and then maps the spread symbols to the sub-carriers. The sub-carrier mapping block maps the complex-valued symbols to the sub-carriers and outputs a first sub-band and a second sub-band. A Null may be inserted between each two consecutive sub-bands. The complex-valued symbols within one sub-band may be mapped to consecutive sub-bands within the frequency domain. More specifically, a concentrated mapping method may be used in one sub-band. Accordingly, the signal that is mapped as described above may correspond to the sub-band.

The first IDFT block perform IFFT for the first sub-band and may transmit a baseband signal for data corresponding to a time domain signal. The second IDFT block perform IFFT for the second sub-band and may transmit a baseband signal for data corresponding to a time domain signal. Herein, when the given IFFT size is equal to M, the value M may be determined based on a channel bandwidth (wherein M is an integer). In case the DFT size N is equal to the IDFT size N, since the consecutive calculation of the DFT and the IDFT corresponds to an inverse function between the DFT and the IDFT, one may completely cancel the other. However, in case M exceeds N, 0's may be inserted to the remaining exceeding inputs within each of the first IDFT block and the second IDFT block.

The P-to-S block is included in each of the first IDFT block and the second IDFT block and may perform parallel to serial conversion on a baseband signal being outputted from each IDFT block. A first band pass filter may filter a baseband signal being outputted from the first IDFT block. A second band pass filter may filter a baseband signal being outputted from the second IDFT block. Accordingly, it will be apparent that the band pass filter is applied in sub-band units in the UF-OFDM system. Herein, since the information on the filter, such as the length of the filter and the coefficient of the filter, is also determined by the receiving end, the corresponding information may be determined by having the information on the filter received through a physical layer signal or a higher layer signal.

The allocation information on the at least one zero (0) being inserted in the head part and the tail part and the information on the first and second band pass filters may be determined by transmitting a refence signal and by estimating a spread delay length of a channel of a receiving device based on the reference signal.

In case the estimated delay spread length of the channel is changed, the allocation information on the at least one zero (0) being inserted in the head part and the tail part and the information on the first and second band pass filters are determined in accordance with the changed delay spread length. And, in case the estimated delay spread length of the channel is changed, the allocation information on the at least one zero (0) being inserted in the head part and the tail part and the information on the first and second band pass filters are maintained.

A physical layer signal transmits the allocation information on the at least one zero (0) being inserted in the head part and the tail part and the information on the first and second band pass filters via PDCCH or ePDCCH.

A higher layer signal transmits the allocation information on the at least one zero (0) being inserted in the head part and the tail part and the information on the first and second band pass filters via PDSCH or PUSCH.

Additionally, the transmitting device may include a processor, a memory, and a radio frequency (RF) unit. The processor controls all of the above-described the S-to-P block, the DFT block, the sub-carrier mapping block, the plurality of IDFT blocks and P-to-S blocks, and the plurality of band pass filters. The memory is operatively connected to the processor, and the RF unit is operatively connected to the processor. More specifically, a wireless signal being generated by passing through the first IDFT block and the first band pass filter starting from the first sub-band and a wireless signal being generated by passing through the second IDFT block and the second band pass filter starting from the second sub-band are superpositioned and then transmitted or received by the RF unit.

EFFECTS OF THE INVENTION

By adopting a UF-OFDM system applying DFT spread and sub-band unit filters, an Inter-Symbol Interference (ISI) caused by a delay in a multi-path channel may be reduced, and robustness of a multi path spread may be enhanced.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
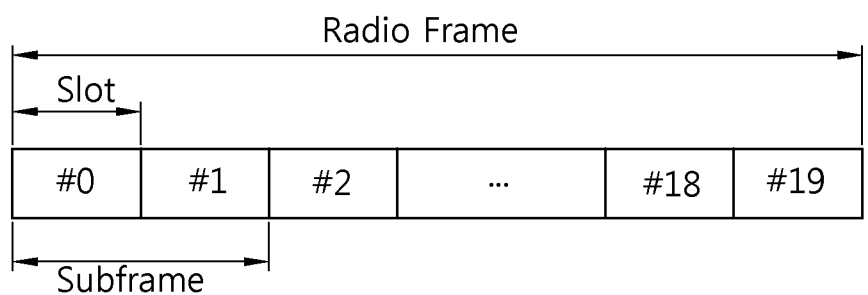
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
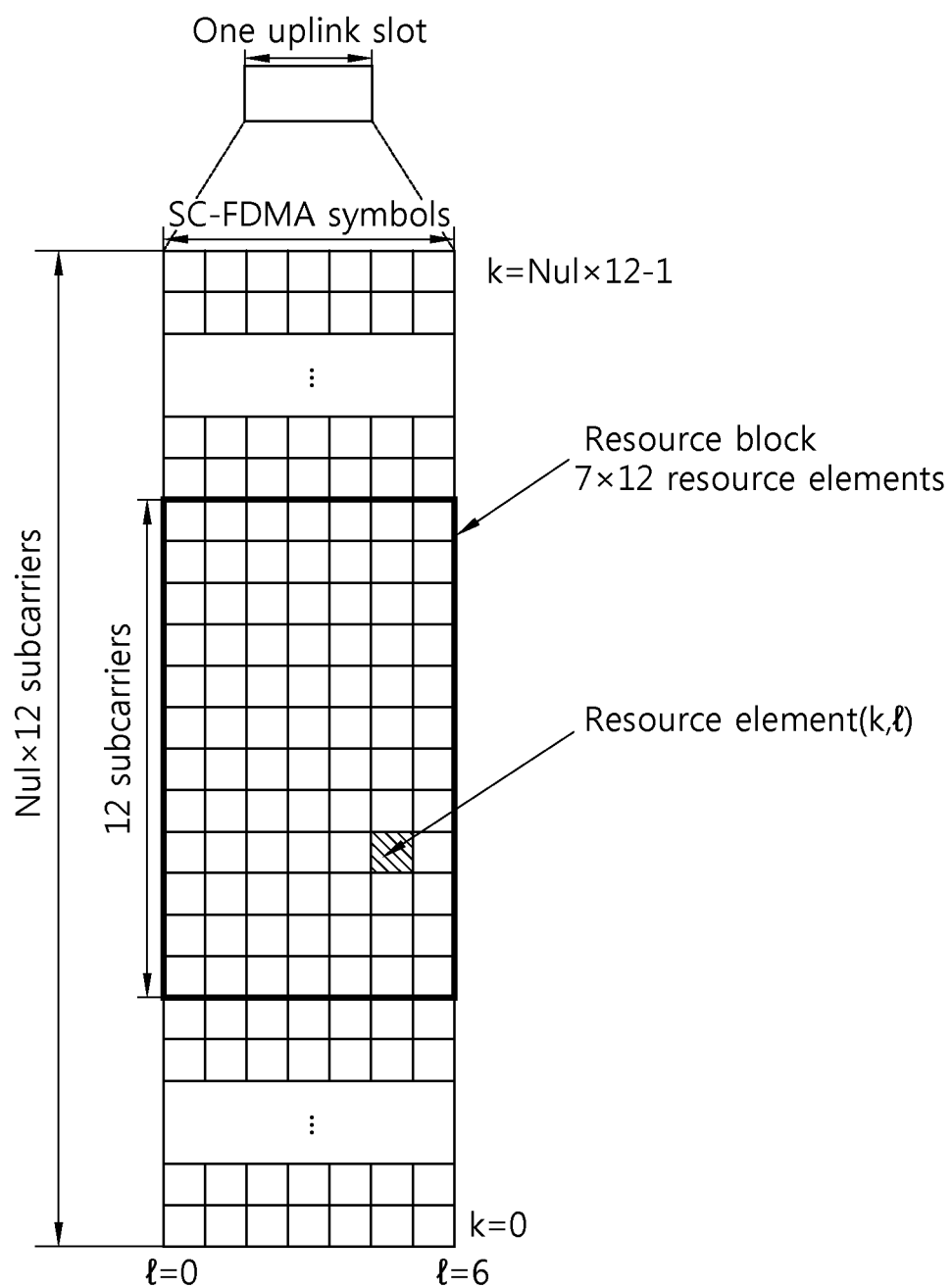
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, the UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, . . . , $N^{UL}$×12−1) denotes a subcarrier index in the frequency domain, and l(l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
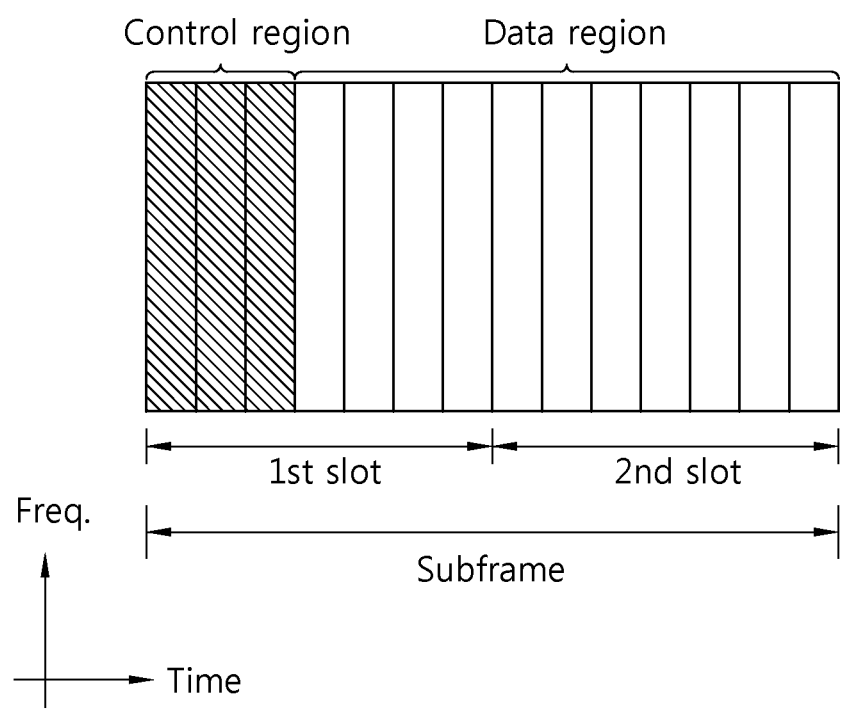
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Figure 4:
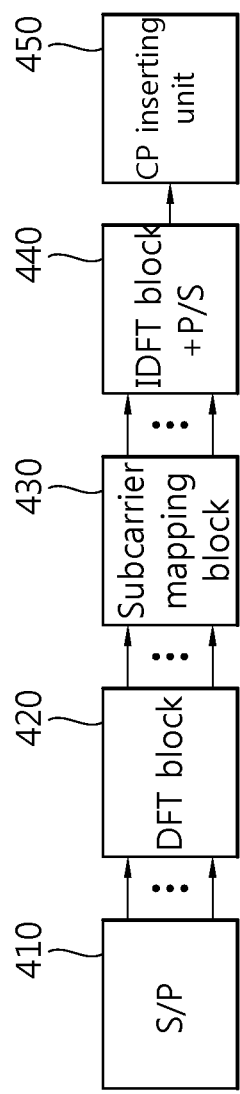
FIG. 4 is a block view illustrating a transmitting end of a legacy OFDM.

FIG. 4 is a block view illustrating a transmitting end of a legacy OFDM.

The legacy OFDM may correspond to a CP-OFDM, wherein a CP is inserted in an OFDM signal in order to resolve the problem of inter-symbol interference within one sub-carrier occurring due to a time-based spreading of the signal.

A transmitting end of the legacy OFDM system includes a S-to-P (S/P) block 410, a DFT block 420, a sub-carrier mapping block 430, an IDFT block and P-to-S (P/S) block 440, and a CP inserting unit 450. Also, the transmitting end of the legacy OFDM system may further include a channel coding unit (not shown) and a modulator (not shown).

The channel coding unit generates coded bits by performing channel coding on information bits. The information bits may be referred to as data being transmitted from the transmitting end. The modulator generates modulated symbols by mapping encoded bits to symbols indicating (or expressing) positions within a signal constellation. Although there is no limitation in the modulation scheme, the modulation scheme may correspond to m-Phase Shift Keying (m-PSK) or m-Quadrature Amplitude Modulation (m-QAM). The modulated symbols are processed with serial-to-parallel conversion by the S-to-P block 410 and may then be inputted to the DFT block 420.

The DFT block 420 performs DFT on the inputted symbols and outputs complex-valued symbols. For example, when N number of symbols are inputted, a DFT size may be equal to N (wherein N is an integer).

The sub-carrier mapping block 430 may also be referred to as a frequency domain data processing block because it maps complex-valued symbols to each sub-carrier. The complex-valued symbols may be mapped to resource elements that are allocated data transmission.

The IDFT block 440 performs IFFT on the inputted symbols and outputs a baseband signal for data corresponding to a time domain signal. Herein, when the given IFFT size is equal to M, the value M may be determined based on a channel bandwidth (wherein M is an integer). In case the DFT size N is equal to the IDFT size N, since the consecutive calculation of the DFT and the IDFT corresponds to an inverse function between the DFT and the IDFT, one may completely cancel the other. However, in case M exceeds N, 0's may be inserted to the remaining exceeding inputs within the IDFT block.

Being included in the IDFT block 440, the P-to-S (P/S) block 440 may perform parallel-to-serial conversion on the baseband signal being outputted from the IDFT block, and the CP inserting unit 450 copies an end part of the baseband signal for the data and inserts the copied end part in front of the baseband signal for data. Since Inter Symbol Interference (ISI) and Inter Carrier Interference (ICI) are prevented due to the CP insertion, orthogonality may also be maintained in the multi-path channel.

As described above, a transmission scheme, wherein IDFT is performed after a DFT spread, is referred to as SC-FDMA. More specifically, in an uplink, the transmitting end performs both DFT and IDFT. The SC-FDMA may also be referred to as a DFT spread-OFDM (DFTS-OFMD). In the SC-FDMA, peak-to-average power ratio (PAPR) or a cubic metric (CM) may be reduced. In case of using the SC-FDMA transmission scheme, transmission power efficiency may be increased in a device having limited power consumption. Accordingly, a user throughput may also be increased.

Figure 5:
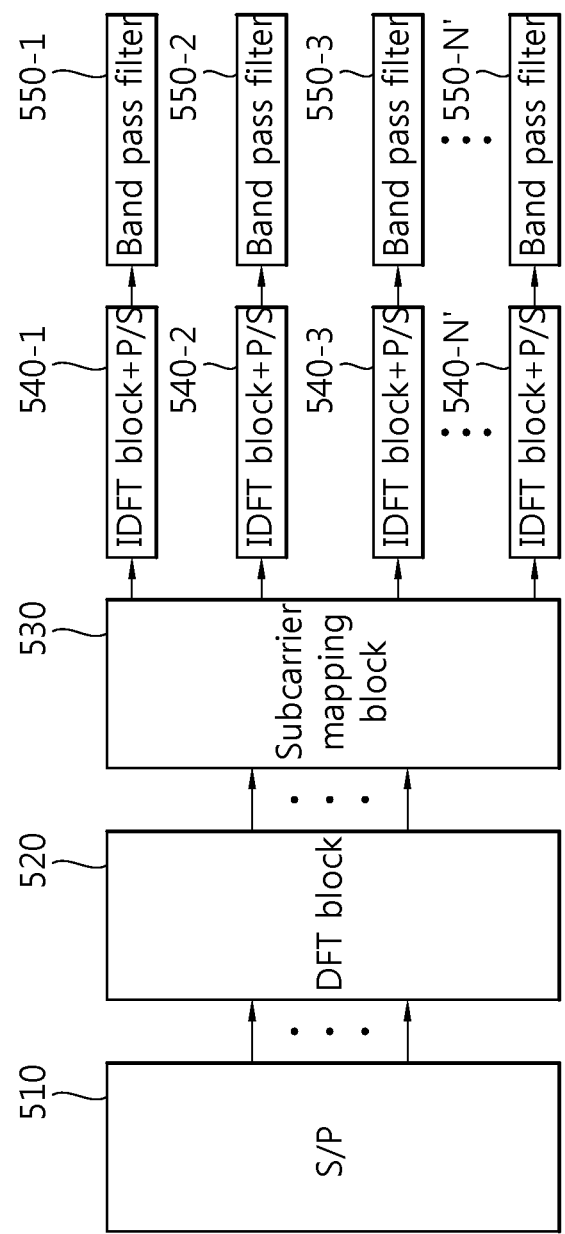
FIG. 5 is block view illustrating a transmitting end of a UF-OFDM.

FIG. 5 is block view illustrating a transmitting end of a UF-OFDM.

Unlike the legacy OFDM system, since the UF-OFDM system does not include a CP inserting unit, CP insertion is not performed on signals being outputted by the IDFT block. Additionally, a band pass filter filtering a signal that is outputted from the IDFT block may be inserted instead of the CP inserting unit. Unlike the legacy OFDM system, which includes only one IDFT block, the UF-OFDM system includes a plurality of IDFT blocks, and the UF-OFDM system is also configured to have a structure, wherein each of a plurality of band pass filters is in a one-to-one correspondence with the plurality of IDFT blocks. Each set of the plurality of IDFT blocks and the plurality of band pass filters may be applied to each sub-band in sub-band units. More specifically, the structure and operation procedures of a transmitting end included in the OF-OFDM system will hereinafter be described in detail.

The transmitting end of the UF-OFDM system includes a S-to-P (S/P) block 510, a DFT block 520, a sub-carrier mapping block 530, a plurality of IDFT blocks and P-to-S (P/S) blocks 540-1, 540-2, . . . , 540-N', and a plurality of band pass filters 550-1, 550-2, . . . , 550-N'. Also, the transmitting end of the UF-OFDM system may further include a channel coding unit (not shown) and a modulator (not shown).

Just as in the transmitting end of the legacy OFDM system, the channel coding unit generates coded bits by performing channel coding on information bits. The information bits may be referred to as data being transmitted from the transmitting end. The modulator generates modulated symbols by mapping encoded bits to symbols indicating (or expressing) positions within a signal constellation. Although there is no limitation in the modulation scheme, the modulation scheme may correspond to m-Phase Shift Keying (m-PSK) or m-Quadrature Amplitude Modulation (m-QAM). The modulated symbols are processed with serial-to-parallel conversion by the S-to-P block 510 and may then be inputted to the DFT block 520.

The DFT block 520 performs DFT on the inputted symbols and outputs complex-valued symbols. For example, when N number of symbols are inputted, a DFT size may be equal to N (wherein N is an integer).

The sub-carrier mapping block 530 may also be referred to as a frequency domain data processing block because it spreads out the outputted complex-valued symbols in the frequency domain and then maps the spread symbols to the sub-carriers. The sub-carrier mapping block maps the complex-valued symbols to the sub-carriers and outputs N' number of sub-bands (wherein N' is an integer). Herein, the N' number of sub-bands may be indicated as sub-band #1, sub-band #2, . . . , sub-band #N'. A Null may be inserted between each two consecutive sub-bands. The complex-valued symbols within one sub-band may be mapped to consecutive sub-bands within the frequency domain. More specifically, a concentrated mapping method may be used in one sub-band. Accordingly, the signal that is mapped as described above may correspond to the sub-band.

The plurality of IDFT blocks 540-1, 540-2, . . . , 540-N' may perform IFFT for each sub-band among the N' number of sub-bands and may transmit a baseband signal for data corresponding to a time domain signal. More specifically, a $n^{th}$ IDFT block 540-$n$ may perform IFFT to sub-block #n and may then output an $n^{th}$ baseband signal (wherein n=1, 2, . . . , N'). Herein, when the given IFFT size is equal to M, the value M may be determined based on a channel bandwidth (wherein M is an integer). In case the DFT size N is equal to the IDFT size N, since the consecutive calculation of the DFT and the IDFT corresponds to an inverse function between the DFT and the IDFT, one may completely cancel the other. However, in case M exceeds N, 0's may be inserted to the remaining exceeding inputs within each of the IDFT blocks 540-1, 540-2, . . . , 540-N'.

The P-to-S block is included in each of the plurality of IDFT blocks 540-1, 540-2, . . . , 540-N' and may perform parallel to serial conversion on a baseband signal being outputted from each IDFT block. A plurality of band pass filters 550-1, 550-2, . . . , 550-N' may be in a one-to-one correspondence with the plurality of IDFT blocks 540-1, 540-2, . . . , 540-N' and may filter the baseband signal being outputted from the corresponding IDFT block. More specifically, the $n^{th}$ band pass filter filters a baseband signal, which is outputted from the $n^{th}$ IDFT block (wherein n=1, 2, . . . , N'). Accordingly, it will be apparent that the band pass filter is applied in sub-band units in the UF-OFDM system. Herein, the length of each band pass filter may be given as L.

Herein, the OF-OFDM system also corresponds to an OFDM system wherein DFT spread is adopted. More specifically, in an uplink, the transmitting end may perform both DFT and IDFT.

Figure 6:
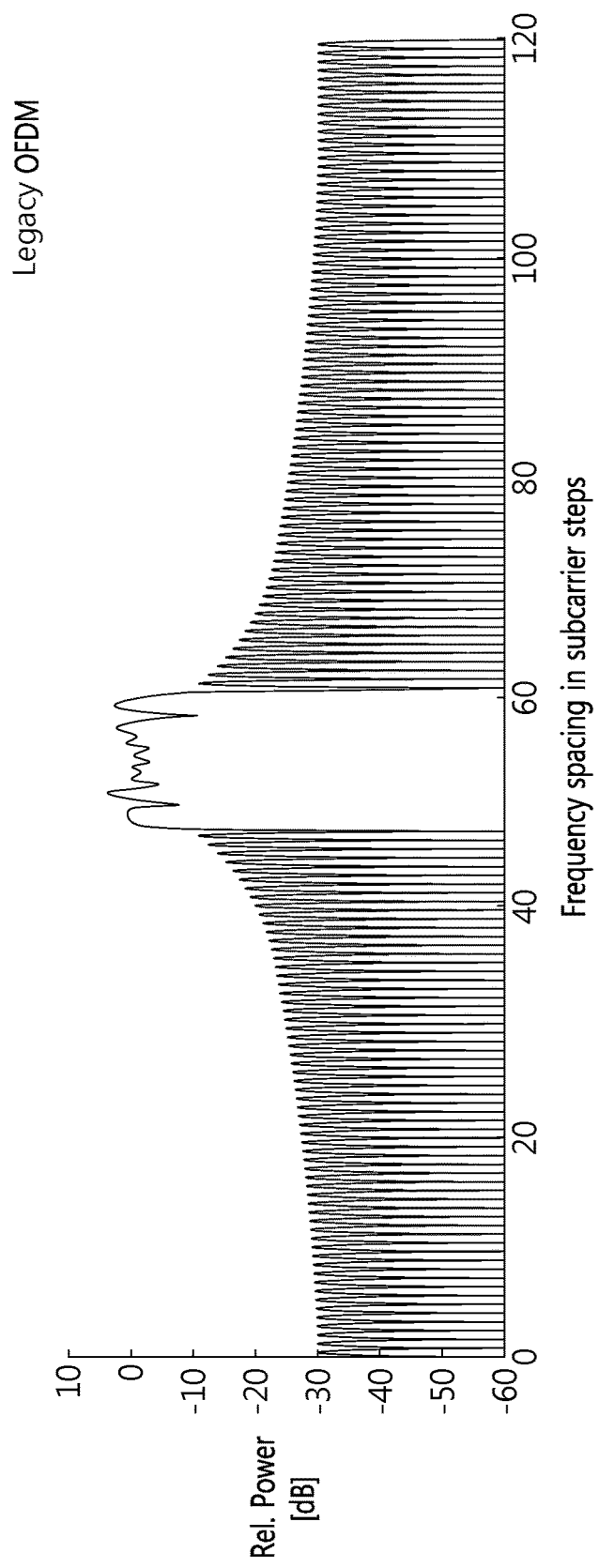
FIG. 6 is a graph indicating a power spectrum in a frequency domain of the conventional OFDM.

FIG. 6 is a graph indicating a power spectrum in a frequency domain of the conventional OFDM. And, FIG. 7 is a graph indicating a power spectrum in a frequency domain of the UF-OFDM.

Figure 7:
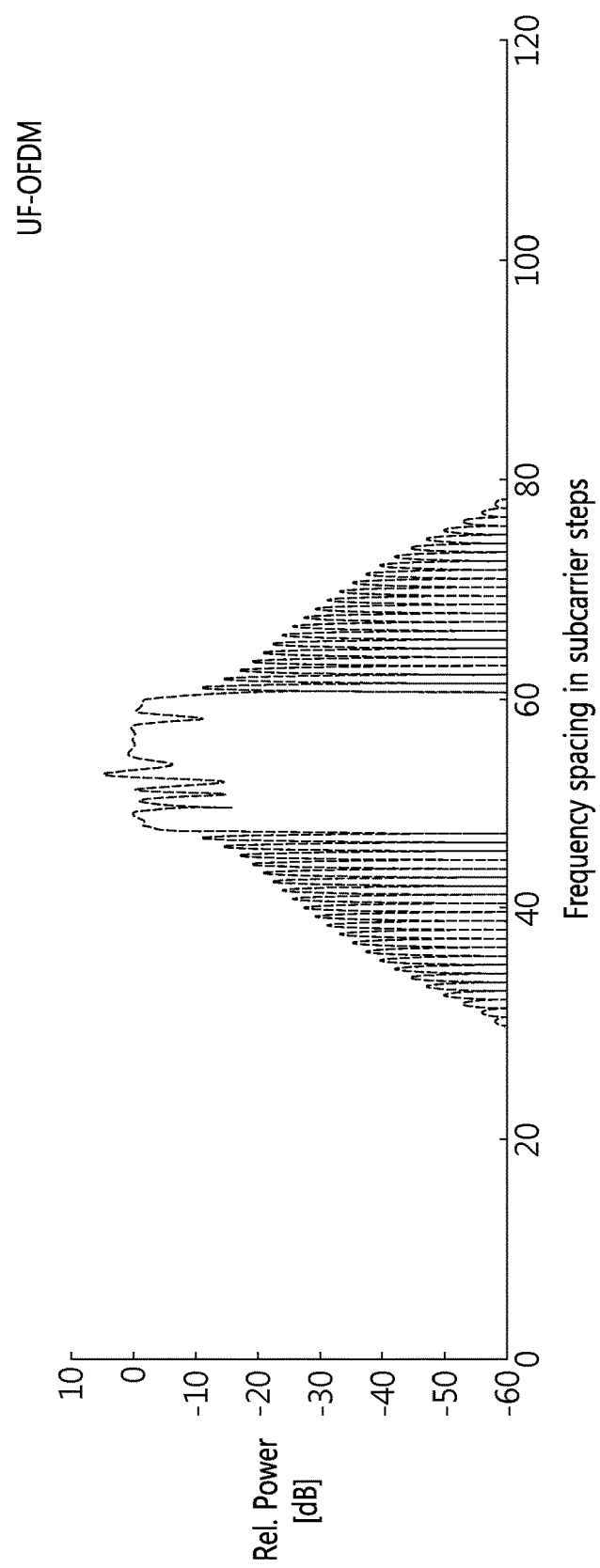
FIG. 7 is a graph indicating a power spectrum in a frequency domain of the UF-OFDM.

FIG. 6 and FIG. 7 show a comparison of power spectrums in an actual frequency domain of a legacy OFDM system, wherein CP-OFDM is applied, and a UF-OFDM system, wherein band pass filters are applied inn sub-band units. FIG. 6 illustrates a power spectrum in the frequency domain of the legacy OFDM system, and FIG. 7 illustrates a power spectrum in the frequency domain of the UF-OFDM system.

By adopting band pass filters in sub-band units, the UF-OFDM system may significantly reduce the influence caused to another neighboring band as compared to the legacy OFDM system. Such characteristic has a significant gain in the aspect of a usage of a fragmented spectrum in a situation where the current frequency resource is exhausted. Additionally, this characteristic also acts a base structure for the next generation technology communication.

Referring to FIG. 6, based on one sub-band, in case of the legacy OFDM system, the power of the signal influencing another band gradually weakens. Conversely, referring to FIG. 7, in case of the UF-OFDM, it is apparent that the power of the signal influencing another band weakens quickly. More specifically, due to the characteristic of reducing the influence caused to another neighboring signal by the signal is considered as a candidate for the next generation waveform.

Figure 8:
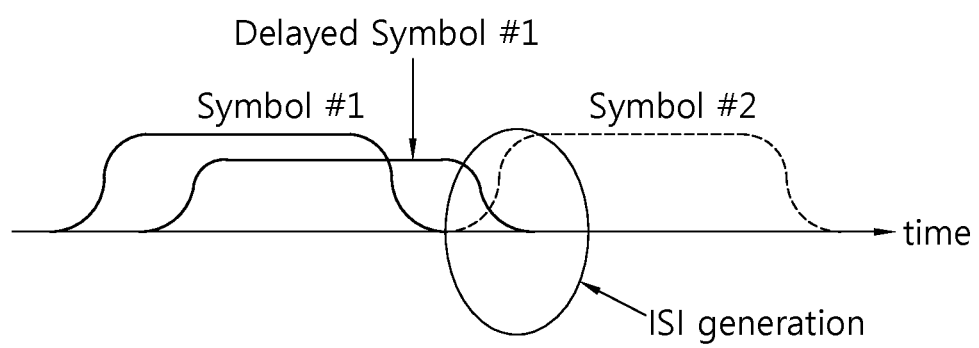
FIG. 8 illustrates an ISI generated by a delay caused by a multi-path in the UF-OFDM.

FIG. 8 illustrates an ISI generated by a delay caused by a multi-path in the UF-OFDM.

The UF-OFDM system is advantageous in that it can reduce the influence caused by the signal to another neighboring band. However, since band pass filters are applied herein in sub-band units instead of inserting CPs, the UF-OFDM system is also disadvantageous in that its performance is weakened due to a delay caused by a multi-path as long as a CP length. More specifically, unlike the legacy OFDM system, the UF-OFDM system does not have the advantageous effect of eliminating the interference with a previous symbol that is due to a delay caused by a multi-path as long as a CP length, i.e., Inter Symbol Interference (ISI). In other words, as shown in FIG. 8, in the UF-OFDM system, symbol #1 overlays with symbol #2 due to a delay caused by the multi-path, and, since a CP is not inserted in the corresponding part, a significant level of ISI is generated.

Figure 9:
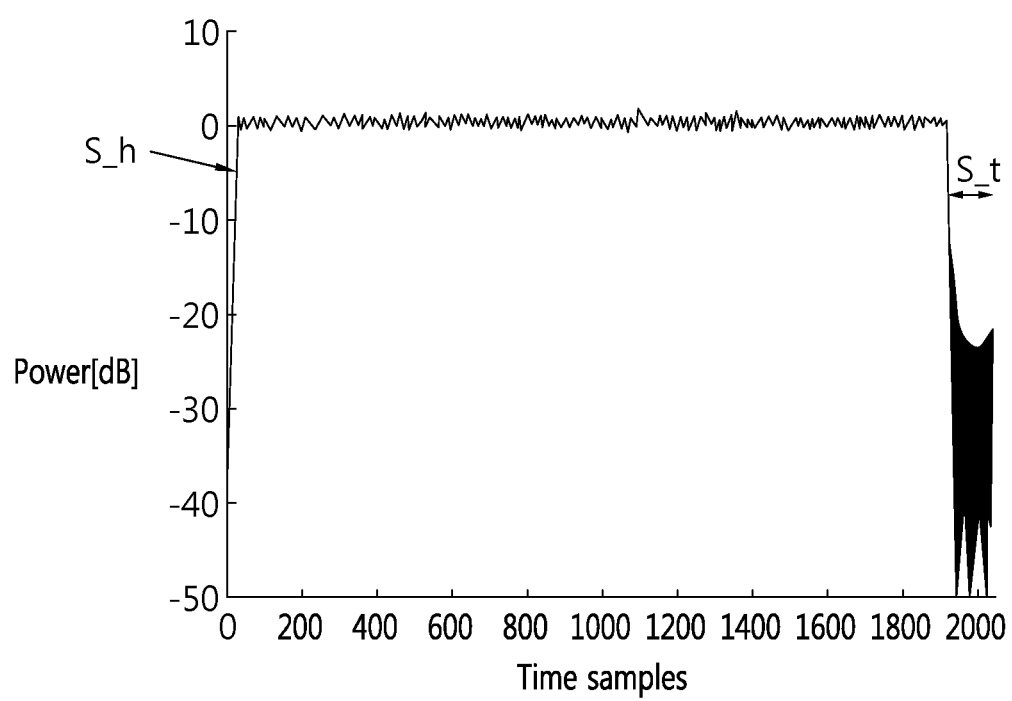
FIG. 9 is a graph indicating a DFT spread OFDM signal having 0's inserted in its head part and tail part. conceptual view illustrating a transmission of a MU PPDU according to an exemplary embodiment of the present invention.

FIG. 9 is a graph indicating a DFT spread OFDM signal having 0's inserted in its head part and tail part, conceptual view illustrating a transmission of a MU PPDU according to an exemplary embodiment of the present invention.

Evidently, as shown in FIG. 8, since the waveform of the transmission signal has a smooth pulse waveform instead of a rectangular pulse waveform, the ISI that is generated due to a delay caused by the multi-path may be reduced to a predetermined level. However, the length of the section corresponding to the smooth pulse waveform is not designed to achieve the object of preventing the delay caused by the multi-path of a channel. Instead, the length of the corresponding section is determined by a level of reducing out-of-band (OOB) emission of the sub-band. Therefore, an enhancement for reducing the ISI is required.

One of the simplest methods for enhancing the reduction of the ISI is to keep a zero guard time. More specifically, this corresponds to a method of inserting 0's in the time domain. By setting up a zero guard time, the ISI that is generated due to a delay caused by the multi-path with a previous symbol may be reduced. However, setting up a guard time of a fixed time regardless of a channel environment may result in a loss in time resource. Moreover, by setting the signal to 0, which results in a rectangular pulse waveform, this method also has the disadvantage of excessively reducing the effect of out-of-band (OOB) emission.

FIG. 9 illustrates a signal that is configured to have a smooth pulse waveform at its head part, which corresponds to the beginning of the signal, and at its tail part, which corresponds to the end of the signal, in the time domain by filling a predetermined part of the data signal by using the DFT spread method. More specifically, the DFT spread is performed by inserting 0's during a S_h time sample duration of the head part of the signal and during a S_t time sample duration of the tail part of the signal. This, out-of-band (OOB) emission via data loss may be adequately reduced. By combining the DFT spread method with the above-described method of adopting band pass filters in sub-band units, the combined method may be advantageous in eliminating the ISI that is generated due to the delay caused by the multi-path in the UF-OFDM system.

More specifically, the method of adopting band pass filters in sub-band units has the advantageous effect of reducing OOB emission. In other words, the length of a band pass filter is determined in accordance with the aspect of out-of-band (OOB) emission. Therefore, in order to reduce the ISI that is generated due to the delay caused by the multi-path, the DFT spread method is required. However, signaling from a receiving end to a transmitting end indicating a number of 0's that are needed to be inserted in accordance with the channel status is required to be performed, in order to implement a UF-OFDM system adopting the DFT spread.

Figure 10:
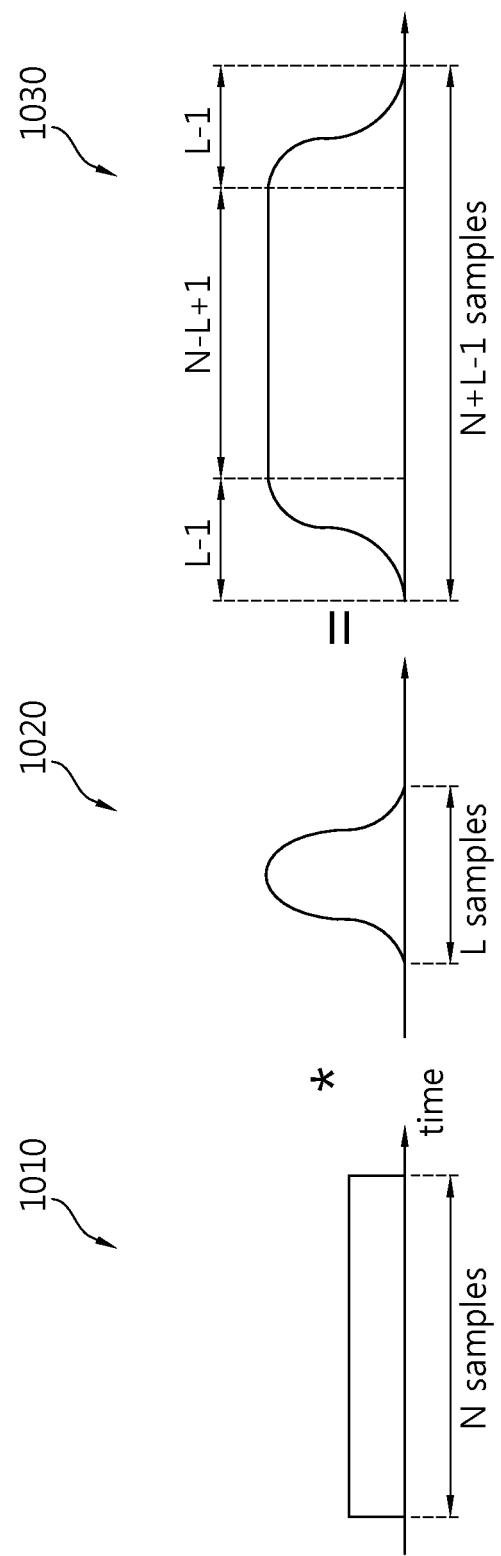
FIG. 10 illustrates a signal of the UF-OFDM that does not adopt DFT spread.

FIG. 10 illustrates a signal of the UF-OFDM that does not adopt DFT spread. And, FIG. 11 illustrates a signal of the UF-OFDM that adopts DFT spread.

Referring to FIG. 10, a signal 1010 of a time domain, wherein 0 is not inserted and DFT spread is not applied, is filtered by using a band pass filter 1020 having a sample length of L. The signal of the time domain initially had a rectangular pulse waveform having a sample length of N. However, in accordance with the waveform of the band pass filter, the signal is modified to a smooth pulse waveform 1030 having a total sample length of N+L−1. Due to its smooth pulse waveform 1030, the size of the interference signal may be reduced to a predetermined smaller size, and this is referred to as a soft protection. Since the smooth part has a sample length of L−1, in order to be protected from the interference, the size of the interference signal should be smaller than the sample length of L−1. Therefore, if the delay caused by the multi-path is longer than the sample length of L−1, a degradation in the system performance caused by interference may occur.

Figure 11:
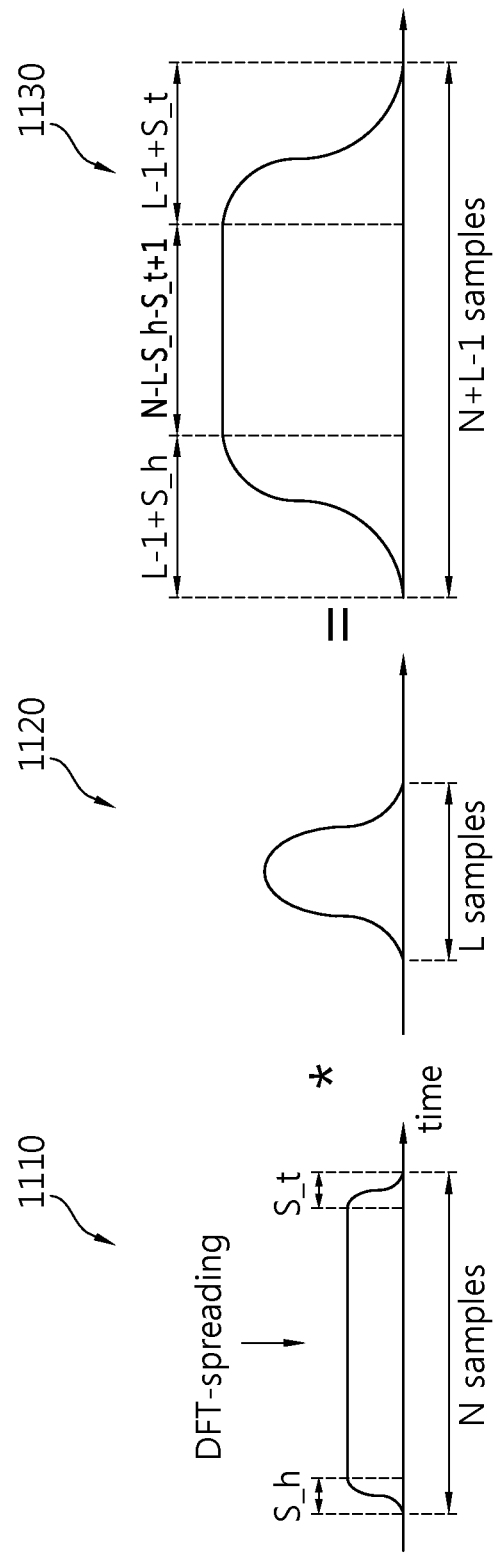
FIG. 11 illustrates a signal of the UF-OFDM that adopts DFT spread.

Therefore, by applying DFT spread as shown in FIG. 11, DFT spread is performed by inserting a number of 0's corresponding to S_h in the head part and by inserting a number of 0's corresponding to S_t in the tail part of a signal 1110 prior to passing through the band pass filter 1120, thereby modifying the signal 1110 to have a smooth pulse waveform, which results in enhancing the system performance by adding robustness against any delay caused by the multi-path. After the signal 1110 passes through the pass band filter 1120, the smooth part of the signal 1130 having the smooth pulse waveform is extended, wherein its head part is extended to a sample length of L−1+S_h and its tail part is extended to a sample length of L−1+S_t. Additionally, a middle part of the signal 1130 having the smooth pulse waveform becomes shorter having a sample length of N−L−S_h−S_t+1. In other words, the length of the waveform corresponding to the part where interference is likely to occur is extended (or becomes longer), and, by reducing the length of the waveform corresponding to the middle part, it may be understood that energy is being accumulated. Thus, even though the delay caused by the multi-path is longer than the sample length of L−1, the degradation in the system performed caused by interference may be prevented.

However, since the lengths of the S_h and S_t are associated with actual data loss, adequate adjustment of the lengths of the S_h and S_t is required. Most particularly, in order to create a smoother waveform at both ends, a larger number of 0 tones (zero tones) may be required. Herein, a tone corresponds to a sub-carrier, and, eventually, a 0 tone (zero tone) corresponds to a sub-carrier that is not being used in order to prevent interference. Furthermore, the length of the filter may also be dynamically optimized based on the lengths of the S_h and S_t. Therefore, it will be most efficient to dynamically implement the system by estimating a duration of a delay caused by multi-path in the channel environment based on the above-described factors.

Hereinafter, a signaling method for reducing interference that occurs due to a delay caused by a multi-path in the UF-OFDM adopting DFT spread will be described in detail. More specifically, information that is dynamically optimized to the transmitting end is notified in accordance with the channel environment of the receiving end. Herein, the information that is required for the signaling process corresponds to a number of allocated 0 tones (zero tones) for the S_h and the S_t and to information on a filter that is to be used. Although the filter used is this specification is described to be a Chebyshev filter, the present invention will not be limited only to this, and, therefore, the filter used herein may be based on a wide variety of filters.

Figure 12:
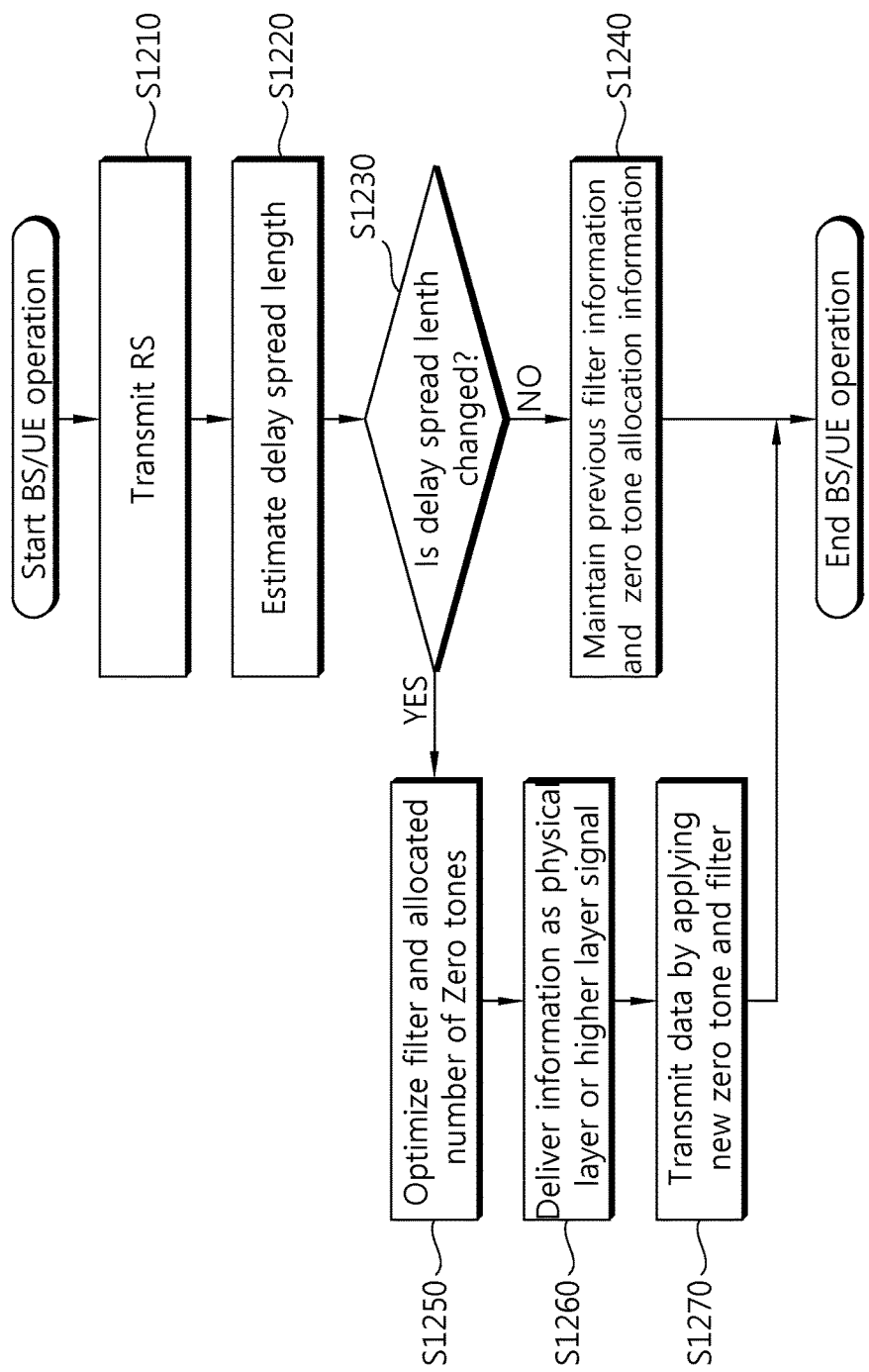
FIG. 12 is a flow chart illustrating performance procedures of transmitting and receiving ends according to an exemplary embodiment of this specification.

FIG. 12 is a flow chart illustrating performance procedures of transmitting and receiving ends according to an exemplary embodiment of this specification.

Referring to FIG. 12, in step S1210, a Reference Signal (RS) for estimating a current channel of the receiving end is transmitted. For example, in case of an uplink, the reference signal (RS) may correspond to a demodulation (DM)-RS or a Sounding Reference Signal (SRS) of an uplink device or a third uplink RS. In case of a downlink, the reference signal (RS) may correspond to a Cell-specific RS (CRS) or a DM-RS of a base station or a third downlink RS. More specifically, the device may correspond to the transmitting end, and the base band may correspond to the receiving end. And, conversely, the base station may correspond to the transmitting end, the device may correspond to the transmitting end.

In step S1220, a delay spread length of a current channel of the receiver is estimated by a channel estimation algorithm through the transmitted RS. At this point, in case of the channel estimation in the frequency domain, the delay length within the time domain may be calculated by performing IDFT/IFFT.

In step S1230, whether or not the delay spread length has been changed is verified by comparing the delay spread length value of a previous channel with the delay spread length value of the current channel. Herein, for example, the delay spread channel length of a channel may be set from one sample length to several sample lengths. In case the set value is small, the system performance may be maintained at its optimal level. However, in this case, an overhead may occur, since signaling is required to be newly performed each time. On the other hand, in case the set value is maintained at a high level, the overhead may be reduced, since signaling is not required to be newly performed each time. However, this may result in a degradation in the system performance. Meanwhile, even if the delay spread length of a channel is changed, its cycle may be considered. More specifically, in case the delay spread length is varied too frequently, a considerable level of overhead may occur due to newly performed signaling. Accordingly, a selected update cycle may be considered by having the receiver select a modified cycle.

In step S1240, in case it is determined that there is no change in the delay spread length, the information on the filter and the number of allocated zero tones (0 tones) that were previously used are maintained without any modification. More specifically, the filter information and the zero tone (0 tone) allocation information are maintained without any modification. Herein, a tone corresponds to a subcarrier, and, eventually, a zero tone (0 tone) corresponds to a sub-carrier that is not being used in order to prevent interference.

In step S1250, since the length of the delay spread caused by the multi-path has been changed in comparison with that of the previous channel, the filter information and the number of allocated zero tones (0 tones) is required to be newly determined based on the changed value. More specifically, the filter information and the zero tone (0 tone) allocation information should be optimized, and such optimization may be determined in accordance with a real-time algorithm. However, considering the processing time, and so on, the optimal information may be determined and verified with reference to a lookup table, as shown below in Table 1. More specifically, by configuring Table 1 shown below in accordance with the delay spread length, the optimal filter length, the optimal filter coefficient, the optimal number of zero tones (0 tones) for S_h, and the optimal number of zero tones (0 tones) for S_t for the corresponding time point may be verified and determined.

TABLE 1

| Channel delay length (# of samples) | Filter length | Filter coefficient | Number of zero tones for S_h | Number of zero tones for S_t |
|---|---|---|---|---|
| 10 | 40 | { ... } | 5 | 10 |
| 20 | 45 | { ... } | 10 | 20 |
| { ... } | { ... } | { ... } | { ... } | { ... } |

In step S1260, the filter information and the zero tone (0 tone) allocation information that are determined in step S1250 are delivered to the transmitting end through a physical layer signal or a higher layer signal.

Firstly, the transmission through a physical layer will be described. In an uplink, through a physical layer signal, a time frequency resource may be allocated to the transmitting end via PDCCH or ePDCCH, and, at the same time, the filter information and the zero tone (0 tone) allocation information may also be notified to the transmitting end. For example, in case both the transmitting end and the receiving end shares the same lookup table shown in Table 1, the corresponding information may be transmitted by delivering the corresponding index indicated in the lookup table.

In a downlink, through a physical layer signal, a time frequency resource may be allocated to the receiving end via PUCCH or PUSCH, and, at the same time, the filter information and the zero tone (0 tone) allocation information may also be notified to the transmitting end. For example, in case both the transmitting end and the receiving end shares the same lookup table shown in Table 1, the corresponding information may be transmitted by delivering the corresponding index indicated in the lookup table.

Though a higher layer signal, in both uplink and downlink, data are transmitted via PDSCH or PUSCH, and, by recovering data in the higher layer, the information may be transmitted.

In step S1270, data may be transmitted by applying the filter information and the zero tone (0 tone) allocation information that are received from the receiving end.

Figure 13:
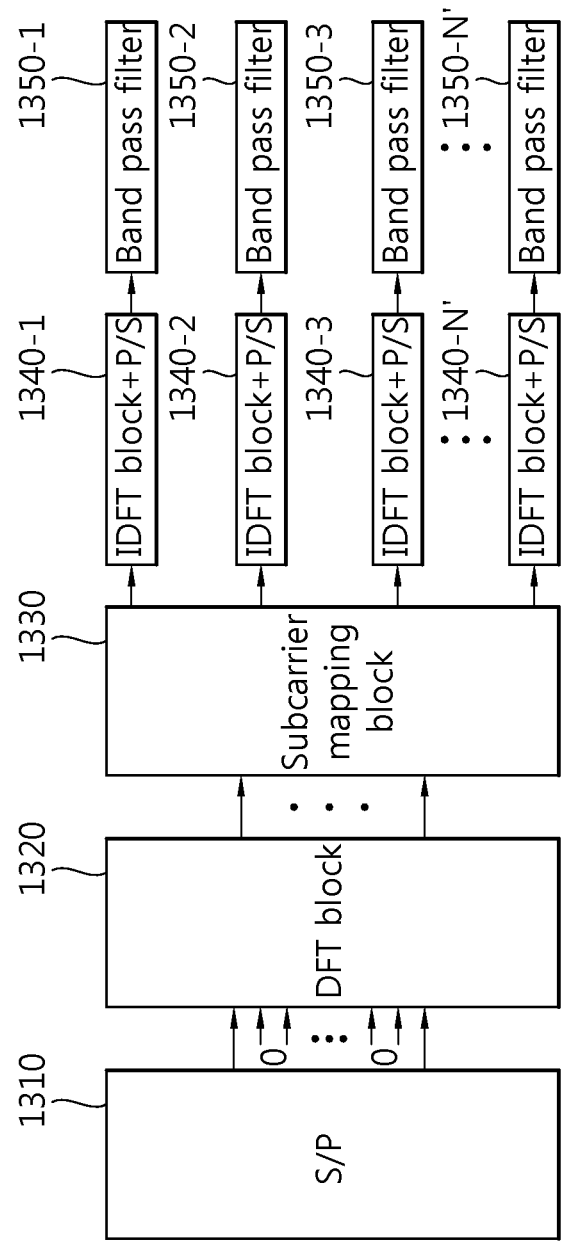
FIG. 13 is a block view illustrating a transmitting end according to an exemplary embodiment of this specification.

FIG. 13 is a block view illustrating a transmitting end according to an exemplary embodiment of this specification.

FIG. 13 illustrates a transmitting end included in a UF-OFDM system adopting DFT spread according to an exemplary embodiment of this specification. The transmitting end may include an S-to-P (S/P) block 1310, a DFT block 1320, a sub-carrier mapping block 1330, a plurality of IDFT blocks and a plurality of P-to-S (P/S) blocks 1340-1, 1340-2, . . . , 1340-N', and a plurality of band pass filters 1350-1, 1350-2, . . . , 1350-N'.

The modulated input symbols are processed with serial-to-parallel conversion by the S-to-P block 1310. And, at least one 0 (zero) is inserted in a head part and a tail part of each of the parallel-converted input symbols. Since the information on the number of allocated zero tones (0 tones) is determined by the receiving end, the number of allocated zeros (0's) may be determined by receiving information through a physical layer signal or a higher layer signal. Herein, a tone corresponds to a sub-carrier, and, eventually, a zero tone (0 tone) corresponds to a sub-carrier that is not being used in order to prevent interference. The input symbol having 0's (zeros) inserted therein in accordance with the above-described process is then transmitted to the DFT block 1320.

The DFT block 1320 performs DFT on the inputted symbols and outputs complex-valued symbols. For example, when N number of symbols are inputted, a DFT size may be equal to N (wherein N is an integer).

The sub-carrier mapping block 1330 may also be referred to as a frequency domain data processing block because it spreads out the outputted complex-valued symbols in the frequency domain and then maps the spread symbols to the sub-carriers. The sub-carrier mapping block maps the complex-valued symbols to the sub-carriers and outputs N' number of sub-bands (wherein N' is an integer). Herein, the N' number of sub-bands may be indicated as sub-band #1, sub-band #2, . . . , sub-band #N'. A Null may be inserted between each two consecutive sub-bands. The complex-valued symbols within one sub-band may be mapped to consecutive sub-bands within the frequency domain. More specifically, a concentrated mapping method may be used in one sub-band. Accordingly, the signal that is mapped as described above may correspond to the sub-band.

The plurality of IDFT blocks 1340-1, 1340-2, . . . , 1340-N' may perform IFFT for each sub-band among the N' number of sub-bands and may transmit a baseband signal for data corresponding to a time domain signal. More specifically, a $n^{th}$ IDFT block 1340-$n$ may perform IFFT to sub-block #n and may then output an $n^{th}$ baseband signal (wherein n=1, 2, . . . , N'). Herein, when the given IFFT size is equal to M, the value M may be determined based on a channel bandwidth (wherein M is an integer). In case the DFT size N is equal to the IDFT size N, since the consecutive calculation of the DFT and the IDFT corresponds to an inverse function between the DFT and the IDFT, one may completely cancel the other. However, in case M exceeds N, 0's may be inserted to the remaining exceeding inputs within each of the IDFT blocks 1340-1, 1340-2, . . . , 1340-N'.

The P-to-S block is included in each of the plurality of IDFT blocks 1340-1, 1340-2, . . . , 1340-N' and may perform parallel to serial conversion on a baseband signal being outputted from each IDFT block. A plurality of band pass filters 1350-1, 1350-2, . . . , 1350-N' may be in a one-to-one correspondence with the plurality of IDFT blocks 1340-1, 1340-2, . . . , 1340-N' and may filter the baseband signal being outputted from the corresponding IDFT block. More specifically, the $n^{th}$ band pass filter filters a baseband signal, which is outputted from the $n^{th}$ IDFT block (wherein n=1, 2, . . . , N'). Accordingly, it will be apparent that the band pass filter is applied in sub-band units in the UF-OFDM system. Herein, since the information on the filter, such as the length of the filter and the coefficient of the filter, is also determined by the receiving end, the corresponding information may be determined by having the information on the filter received through a physical layer signal or a higher layer signal.

Figure 14:
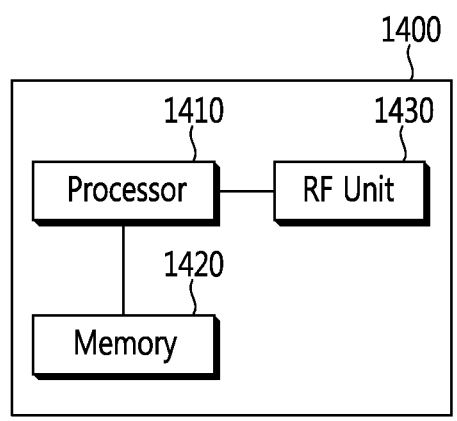
FIG. 14 is a block diagram showing an apparatus for wireless communication for implementing an embodiment of this specification.

FIG. 14 is a block diagram showing an apparatus for wireless communication for implementing an embodiment of this specification.

A wireless device 1400 may include a processor 1410, a memory 1420, and a radio frequency (RF) unit 1430. Also, the wireless device 1400 may correspond to a transmitting device (or transmitting end) or a receiving device (or receiving end).

The processor 1410 may be configured to implement the above-described functions, procedures, and methods. More specifically, the processor controls the S-to-P block 1310, the DFT block 1320, the sub-carrier mapping block 1330, the plurality of IDFT blocks and P-to-S blocks 1340-1, 1340-2, . . . , 1340-N', and the plurality of band pass filters 1350-1, 1350-2, . . . , 1350-N', which are shown in FIG. 13. Layers of a radio interface protocol may be implemented in the processor. The processor 1410 may perform procedures for performing the above-described operations. The memory 1420 is operatively connected to the processor 1410, and the RF unit 1430 is operatively connected to the processor 1410. More specifically, N' number of wireless signals (or radio signals), which are generated by passing through the plurality of IDFT blocks 1340-1, 1340-2, . . . , 1340-N' and the plurality of band pass filters 1350-1, 1350-2, . . . , 1350-N' starting from N' number of sub-bands, are all superpositioned. Thereafter, the subpositioned wireless signals are transmitted or received by the RF unit 1430.

The processor 1410 may include application-specific integrated circuit (ASIC), other chipset, logic circuit and/or data processing device. The memory 1420 may include read-only memory (ROM), random access memory (RAM), flash memory, memory card, storage medium and/or other storage device. The RF unit 1430 may include baseband circuitry to process radio frequency signals. When the embodiments are implemented in software, the techniques described herein can be implemented with modules (e.g., procedures, functions, and so on) that perform the functions described herein. The modules can be stored in memory 1420 and executed by processor 1410. The memory 1420 can be implemented within the processor 1410 or external to the processor 1410 in which case those can be communicatively coupled to the processor 1410 via various means as is known in the art.

In view of the exemplary systems described herein, methodologies that may be implemented in accordance with the disclosed subject matter have been described with reference to several flow diagrams. For the purpose of simplicity, while the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A transmitting device for transmitting data in a wireless communication system configured based on discrete Fourier transform (DFT) spread orthogonal frequency division multiplexing (OFDM), the transmitting device comprising:
   a processor;
   a DFT block receiving an input symbol, wherein at least one zero (0) is inserted in each of a head part and a tail part of the input symbol, and processing the input symbol with DFT spread;
   a frequency domain data processing block mapping the input symbol being processed with DFT spread to a sub-carrier and outputting a first sub-band and a second sub-band;

a first IDFT block performing inverse discrete Fourier transform (IDFT) on the outputted first sub-band and outputting a signal;
a second IDFT block performing IDFT on the outputted second sub-band and outputting a signal;
a first pass band filter filtering the signal being outputted from the first IDFT block;
a second pass band filter filtering the signal being outputted from the second IDFT block; and
a transceiver transmitting and receiving the outputted signals,
wherein the processor controls the DFT block, the frequency domain data processing block, the first and second IDFT blocks, and the first and second band pass filters, and
wherein allocation information on a number of zeros (0) inserted in the head part and the tail part and information on a length of the first and second band pass filters are determined by a receiving device and transmitted through a physical layer or a higher layer,
wherein the transceiver further transmits a reference signal,
wherein a delay spread length of a channel is estimated by the reference signal, and
wherein, in case the estimated delay spread length of the channel increases, the number of zeros (0) inserted in the head part and the tail part increases and the length of the first and second band pass filters increases.

2. The transmitting device of claim 1, further comprising:
a first serial-to-parallel conversion block processing the input symbol with serial-to-parallel conversion, and a second serial-to-parallel conversion block processing the signal outputted from the first IDFT block and the signal outputted from the second IDFT block with parallel-to-serial conversion.

3. The transmitting device of claim 1, wherein, in case the estimated delay spread length of the channel is changed, the number of zeros (0) inserted in the head part and the tail part and the length of the first and second band pass filters are determined in accordance with the changed delay spread length, and
wherein, in case the estimated delay spread length of the channel is not changed, the number of zeros (0) inserted in the head part and the tail part and on the length of the first and second band pass filters are maintained.

4. The transmitting device of claim 1, wherein the physical layer transmits the allocation information on the number of zeros (0) inserted in the head part and the tail part and the information on the length of the first and second band pass filters via Physical Downlink Control Channel (PDCCH) or enhanced PDCCH (ePDCCH).

5. The transmitting device of claim 1, wherein the higher layer transmits the allocation information on the number of zeros (0) inserted in the head part and the tail part and the information on the length of the first and second band pass filters via Physical Downlink Shared Channel (PDSCH) or Physical Uplink Shared Channel (PDSCH).

* * * * *